Feb. 20, 1962    A. T. FLOWER    3,022,033
SERVICE ATTACHMENT BRACKETS FOR POWER LINES
Filed July 6, 1960
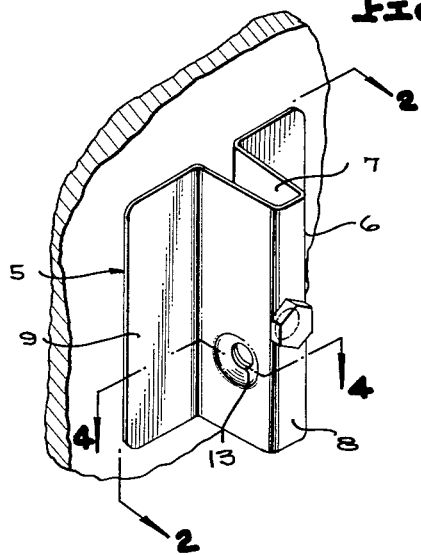
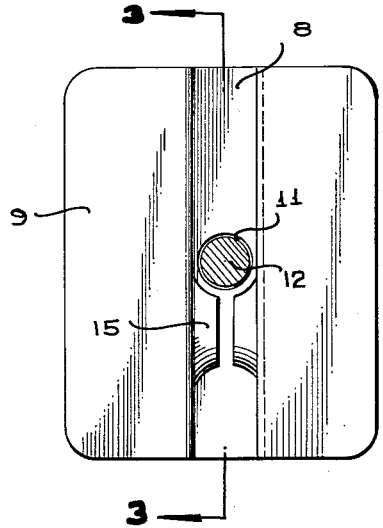
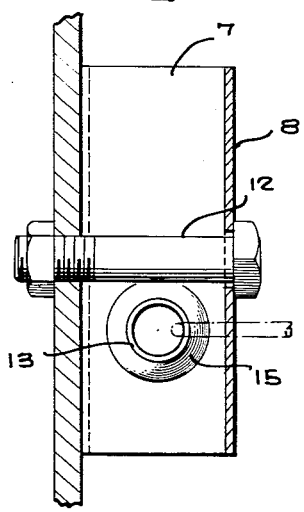
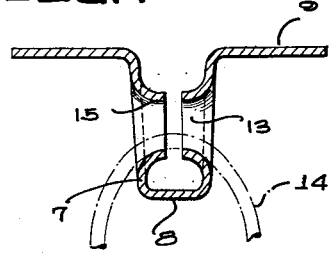
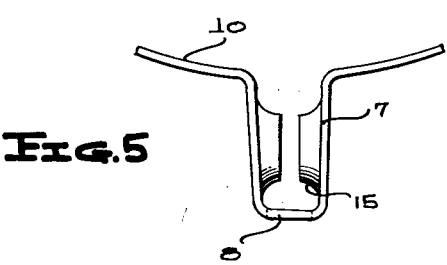
INVENTOR.
ARCHIBALD T. FLOWER
BY Ralph Burch
ATTORNEY

United States Patent Office 3,022,033
Patented Feb. 20, 1962

3,022,033
SERVICE ATTACHMENT BRACKETS FOR POWER LINES
Archibald Thomas Flower, Queen St. and Ivy Hill Road, Glenside, Pa.
Filed July 6, 1960, Ser. No. 41,071
7 Claims. (Cl. 248—300)

This invention relates to a service attachment bracket for electric power lines.

The primary object of the invention is to provide a bracket for attaching electric power service lines to the wall of a building which greatly reduces the stress on the shingles or other siding applied to the wall and which distributes the stress over a comparatively wide area.

A further object of the invention resides in providing a bracket of simple construction that is attached to the building by a single fastener and which may be easily adjusted to support the service line at any angle to the building.

A still further object of the invention resides in providing a bracket having a yoke with alined openings through the sides of the yoke to receive a bail supporting a service line, the edges of the opening being curved inwardly to reduce the wear on the bail and permit free movement of the bail in the openings.

Another object of the invention is to provide a service attachment bracket which is simple in construction, efficient in performing its function and inexpensive to manufacture.

Other objects and advantages of the invention will be apparent during the course of the following description.

In the accompanying drawings, forming a part of this specification and in which like numerals are employed to designate like parts throughout the same, FIG. 1 is a perspective view of the bracket attached to a wall, FIG. 2 is a section taken on line 2—2 of FIG. 1, FIG. 3 is a section taken on line 3—3 of FIG. 2, FIG. 4 is a section taken on line 4—4 of FIG. 1, and, FIG. 5 is a top view of a slightly modified form of bracket.

Referring to the drawings, the numeral 5 denotes generally the bracket which is formed of steel, aluminum or other suitable metal. A single sheet of metal is bent midway its width to form a yoke 6 having side walls 7 and front wall 8, the free ends of the side walls being bent outwardly to form flanges or legs 9 for bearing engagement with the wall of a building or the legs may be curved, as shown at 10, FIG. 5, for engagement with a curved surface such as a pole. The front wall 8 of the yoke 6 is provided in its center with an opening 11 to receive an attaching bolt or lag screw 12 for securing the bracket to a wall or pole. The side walls 7 of the yoke 6 are provided with alined circular openings 13 below the bolt to receive a bail 14 or other device for attaching the service line to the bracket. The edges of the openings 13 are curved inwardly, as at 15, to provide a rounded surface to permit free sliding movement of the bail in all directions.

In use, the service bracket is attached to the wall of a house or building by the single fastener 12 which permits the yoke 6 to be turned at any angle desired. The attaching bail 14 of the service line is inserted through the openings 13 which are below the fastener 12. The bracket is so designed that the stress on the exterior shingles or siding of a house is greatly reduced and the stress is distributed over a comparatively wide area. The rounded edges 15 of the openings 13 reduce the wear on the bail supporting the service line and permit free movement of the bail so that the service line can extend at any angle from the house to the pole supporting the power transmission line.

It is to be understood that the form of the invention herein shown and described is a preferred example of the same and changes in the shape, size and arrangement of the parts may be made without departing from the spirit of the invention.

Having thus described my invention, I claim:

1. A service bracket for attaching a service power line to a building comprising a sheet metal blank bent midway its width to form a yoke having side walls and a front wall, the free ends of the side walls being bent outwardly to form bearing legs, a bolt extending through an opening in the front wall and longitudinally between the side walls for attaching the bracket to a supporting surface, said side walls having alined circular openings with their edges convexly curved inwardly adapted to receive a bail supporting the service line.

2. A service bracket for attaching a service power line to a building comprising a plate having an outwardly projecting U-shape portion midway its width, the sides of said U-shape portion having alined circular openings with inwardly convexly curved edges, and a bolt extending through an opening in the bight of said U-shape portion and longitudinally of the sides above said openings for attaching the bracket to a supporting surface.

3. A service bracket for attaching a service power line to a building comprising a metal plate bent to form spaced parallel walls having at one end outwardly extending flanges for bearing engagement with a supporting surface, a front wall connecting the opposite ends of said parallel walls, and a bolt extending through an opening in said front wall and longitudinally of the parallel walls for attaching said plate to a supporting surface, said parallel walls having alined openings to receive a bail supporting the service power line.

4. A service bracket for attaching a service power line to a building comprising a rectangular metal plate having its central portion pressed outwardly to form a U-shape projection having opposed openings in its side walls adapted to receive a bail supporting a service line, and a fastener extending through an opening in the bight of said projection and longitudinally of the side walls above said openings for securing said plate to a supporting surface.

5. A service bracket as described in claim 4 wherein the edges of said openings are convexly curved inwardly.

6. A service bracket as described in claim 4 wherein the free ends of the side walls of said projection are bent outwardly and curved transversely for engagement with a supporting surface.

7. A service bracket for attaching a service power line to a supporting surface comprising a sheet metal blank of rectangular shape bent midway its width to form a projecting U-shape yoke having parallel side walls and a front wall, said side walls having alined openings with inwardly convexly curved edges adapted to receive a bail supporting the service line, and a bolt extending through an opening in the front wall of said yoke and parallel to the side wall above the openings in the side walls for attaching the bracket to a supporting surface.

References Cited in the file of this patent

UNITED STATES PATENTS

| | | |
|---|---|---|
| 517,338 | Garland | Mar. 27, 1894 |
| 2,089,370 | Heinrich | Aug. 10, 1937 |
| 2,576,695 | Pinson | Nov. 27, 1951 |
| 2,761,643 | Ward | Sept. 4, 1956 |

FOREIGN PATENTS

| | | |
|---|---|---|
| 662,713 | Great Britain | Dec. 12, 1951 |